US007346098B2

United States Patent
Chen et al.

(10) Patent No.: US 7,346,098 B2
(45) Date of Patent: Mar. 18, 2008

(54) COMMUNICATION RECEIVER

(75) Inventors: Weizhong Chen, Austin, TX (US); Sekchin Chang, Austin, TX (US); Satish S. Kulkarni, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 731 days.

(21) Appl. No.: 10/721,950

(22) Filed: Nov. 25, 2003

(65) Prior Publication Data

US 2005/0111530 A1   May 26, 2005

(51) Int. Cl.
*H04B 1/00* (2006.01)
(52) U.S. Cl. ................... 375/150; 375/136; 375/147
(58) Field of Classification Search ............. 375/148, 375/150, 324, 327, 340, 344, 350, 136, 147; 370/342, 347; 455/137
See application file for complete search history.

(56) References Cited

U.S. PATENT DOCUMENTS

| | | | | |
|---|---|---|---|---|
| 4,518,947 | A * | 5/1985 | Poston et al. ............... 341/81 |
| 5,388,126 | A * | 2/1995 | Rypinski et al. ........... 375/364 |
| 5,898,665 | A * | 4/1999 | Sawahashi et al. ........ 370/342 |
| 6,052,409 | A | 4/2000 | Quirk et al. |
| 6,865,174 | B1 * | 3/2005 | Tsubouchi et al. ......... 370/342 |
| 7,161,996 | B1 * | 1/2007 | Steele et al. ............... 375/347 |
| 2004/0076246 | A1 * | 4/2004 | Vanderperren et al. ..... 375/343 |
| 2004/0101068 | A1 * | 5/2004 | Wang et al. ................ 375/324 |
| 2006/0165187 | A1 * | 7/2006 | Troya et al. ................ 375/260 |
| 2007/0025430 | A1 * | 2/2007 | Rasmussen ................. 375/150 |

OTHER PUBLICATIONS

Cheng et al., "Joint Synchronization and Data Detection Digital Receiver for Direct Sequence Spread Spectrum Systems," *IEEE*, 0-7803-3659-3/97, Mar. 1997, pp. 2103-2107.

Halford et al., "Multipath Measurement in Wireless LANs," *Intersil Application Note AN9895.1*, Oct. 2001, pp. 1-8.

Intersil ISL37300U-EVAL, *Intersil Data Sheet File No. 8030*, Nov. 2001, pp. 1-5.

Intersil ISL3873B, *Intersil Data Sheet FN8019.2*, Jun. 2002, pp. 1-42.

Ishizu et al., "Simultaneous Estimation of Code and Frequency of DS/SS Signals of Multiple-LEO-Satellite Communication Systems," *IEEE*, 0-7803-3871-5/97, May 1997, pp. 1019-1023.

Joseph et al., "Run-Time Power Estimation in High Performance Microprocessors," *ISLPED '01*, Aug. 6-7, 2001, Huntington Beach, California, pp. 135-140.

Lashkarian et al., "Minimum Variance Unbiased Estimation of Frequency Offset in OFDM Systems, a Blind Synchronization Approach," *IEEE 0-7803-6293-4/00*, Apr. 2000, pp. 2945-2948.

Mauss et al., "Carrier Frequency Recovery for a Fully Digital Direct-Sequence Spread-Spectrum Receiver: A Comparison," *IEEE 0-7803-1266-x/93*, 1993, pp. 392-395.

\* cited by examiner

*Primary Examiner*—Mohammed Ghayour
*Assistant Examiner*—Lawrence Williams
(74) *Attorney, Agent, or Firm*—David G. Dolezal; Michael P. Noonan; Ranjeev Singh

(57) ABSTRACT

A timing and carrier error detector module (127) of a communication receiver (111). The timing and carrier error detector module uses phase information of a correlated signal (e.g. a Barker de-spread signal) to generate a timing signal and carrier error signal. In one example, the phase information includes a phase error signal of the correlated signal. In one example, the timing and carrier error detector module calculates an indication of the variance of the phase error signal for a plurality of sample positions over a plurality of Barker symbol intervals. The timing signal is based upon the sample position having a minimum indication of a variance.

29 Claims, 6 Drawing Sheets

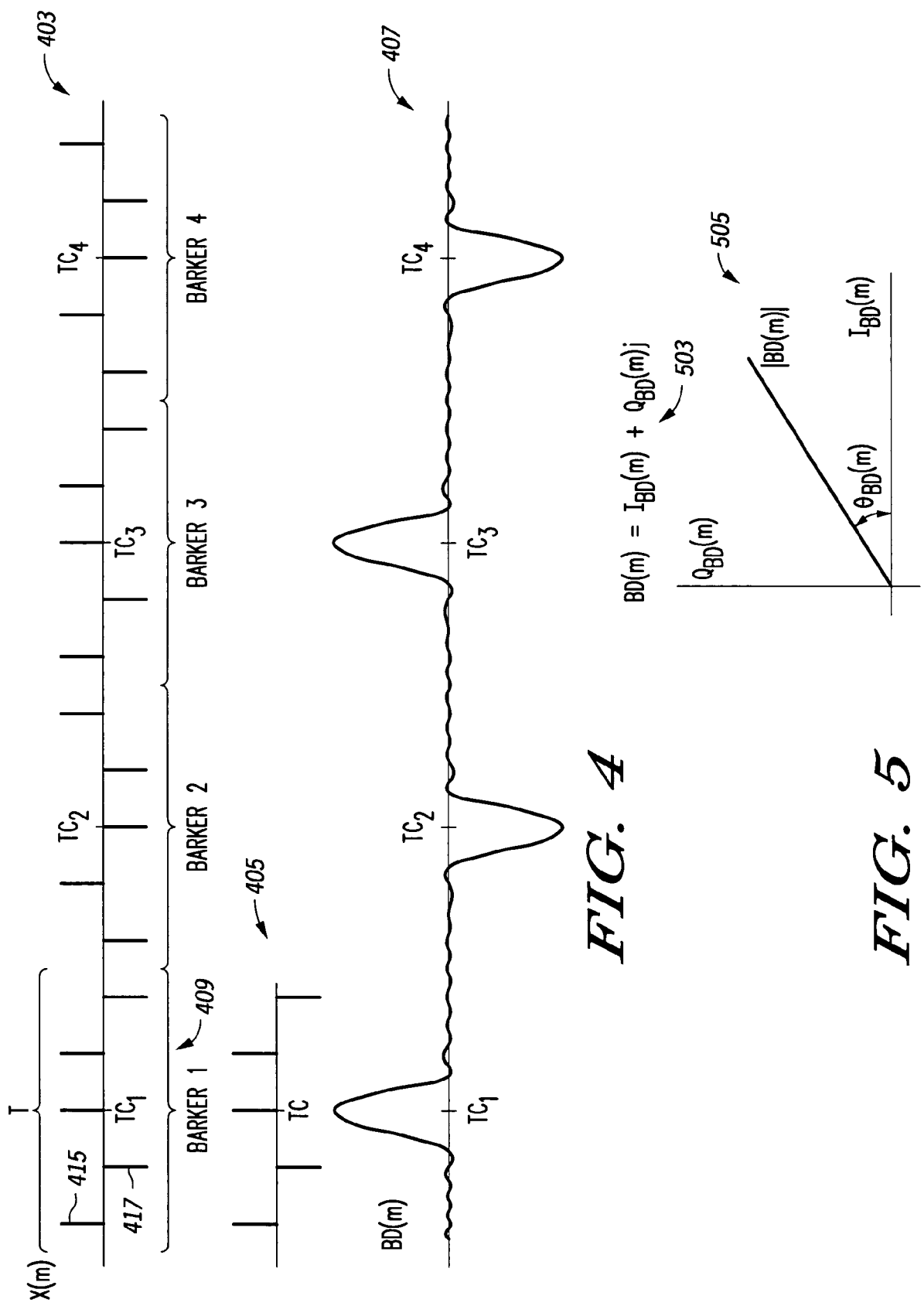

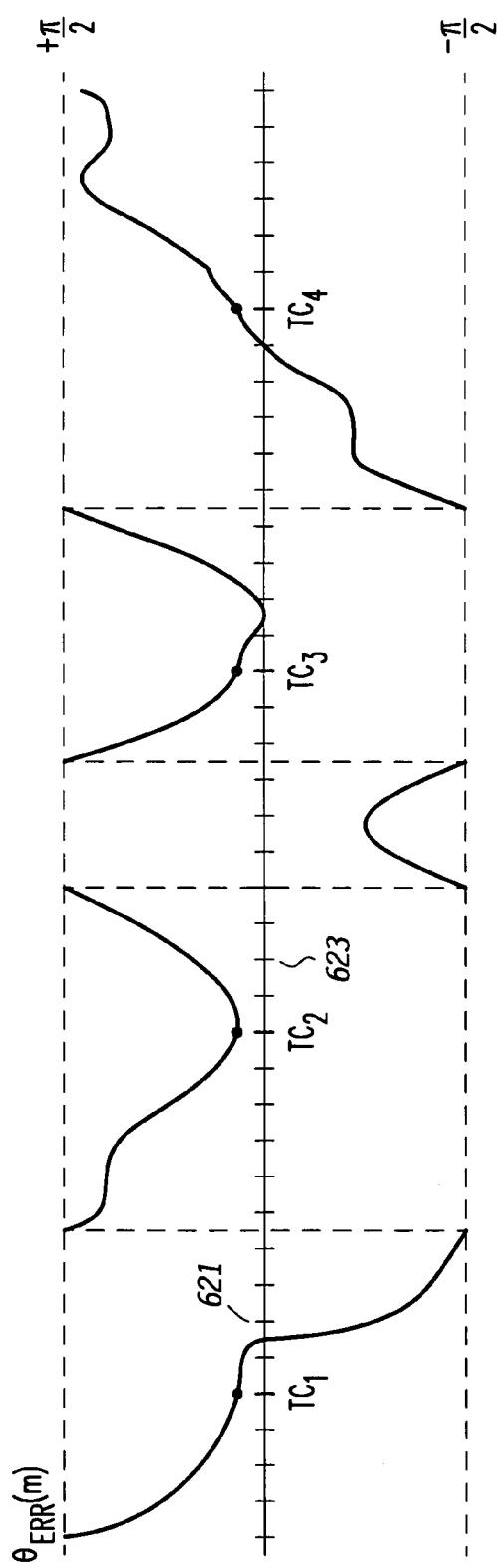
FIG. 6
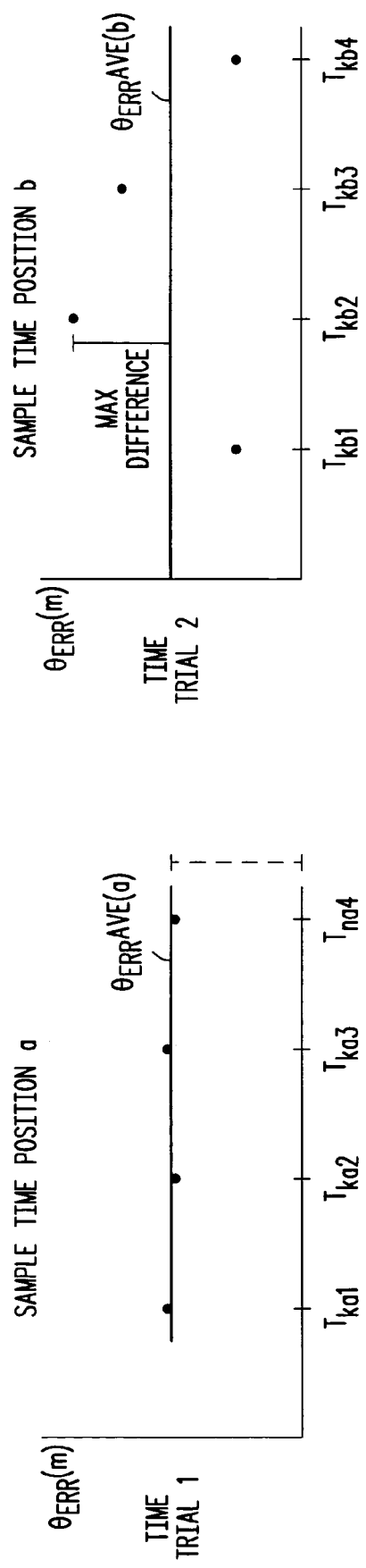
FIG. 7
FIG. 8

COMMUNICATION RECEIVER

BACKGROUND OF THE INVENTION

1. Field of the Invention

This invention in general relates to communication devices and in particular to receivers for communication devices.

2. Description of the Related Art

Communication receivers (e.g. wireless receivers) are utilized by communication devices for obtaining information contained in signals transmitted by other communication devices. Some receivers include a timing synchronization circuit for generating a timing signal from a received signal. The timing signal provides information regarding the beginning of a data portion of a data packet encoded in a received signal. Some wireless receivers also include a carrier synchronization circuit for detecting a difference between an oscillator frequency of the receiver and an oscillator frequency of a transmitter transmitting the signals (carrier frequency error).

With some receivers, a timing signal is extracted by searching for the peak magnitude of a correlation signal of the received signal with a known pattern. In the WLAN 802.11b communication protocol as set forth by the IEEE, a synchronization portion of a data packet is encoded with a sequence of Barker symbols having a certain polarization pattern. A receiver may use a Barker de-spreader to generate a Barker de-spread signal (a correlated signal) by correlating the received signal with a standard Barker symbol. The Barker de-spread signal ideally should exhibit a sequence of pulses with a certain polarization pattern and spaced apart by the time period of a Barker symbol (Barker symbol interval). The positions of the pulses of the Barker de-spread signal are used to establish a symbol boundary (e.g. Barker symbol boundary). After the symbol boundary is establish, phase errors between pulses are calculated, processed, and averaged to estimate phase error caused by the carrier frequency error. This phase error is used to calculate the frequency error, which is used to correct carrier error for the received signal.

The magnitude of the Barker de-spread signal is a sequence of pulses with same polarization and is periodic with a known period of the Barker symbol interval. Ideally, the de-spread signal should have a signal peak within each symbol interval. In a conventional approach, the magnitude signal of the Barker de-spread signal is truncated into segments, each with a length of a Barker symbol interval. These segments are averaged and a peak of the average is used to generate timing information indicative of a Barker symbol boundary. However, in a noisy, and especially harsh, channel environment, each pulse in the Barker de-spread signal may exhibit multiple peaks due to multi-path interference. Accordingly, the above approach for generating a timing signal in such an environment may be difficult.

Furthermore, with the above approach, timing information is first extracted from a Barker de-spread signal prior to determining carrier frequency error. Such a system reduces the time available for carrier error detection, thus reducing the performance of detecting the timing information and carrier error.

What is needed is improved timing and carrier error synchronization for a communication receiver.

BRIEF DESCRIPTION OF THE DRAWINGS

The present invention may be better understood, and its numerous objects, features, and advantages made apparent to those skilled in the art by referencing the accompanying drawings.

FIG. 4 sets forth examples of an input signal to a Barker de-spreader, a standard Barker symbol, and an output signal of a Barker de-spreader according to one embodiment of the present invention.

FIG. 5 sets forth an example of a graphical mapping of a phase angle signal.

FIG. 6 sets forth an example of a phase error signal according to one embodiment of the present invention.

FIG. 7 sets forth a graph showing one embodiment of phase error signal values for a sample position according to the present invention.

FIG. 8 sets forth a graph showing one embodiment of phase error signal values for another sample position according to the present invention.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
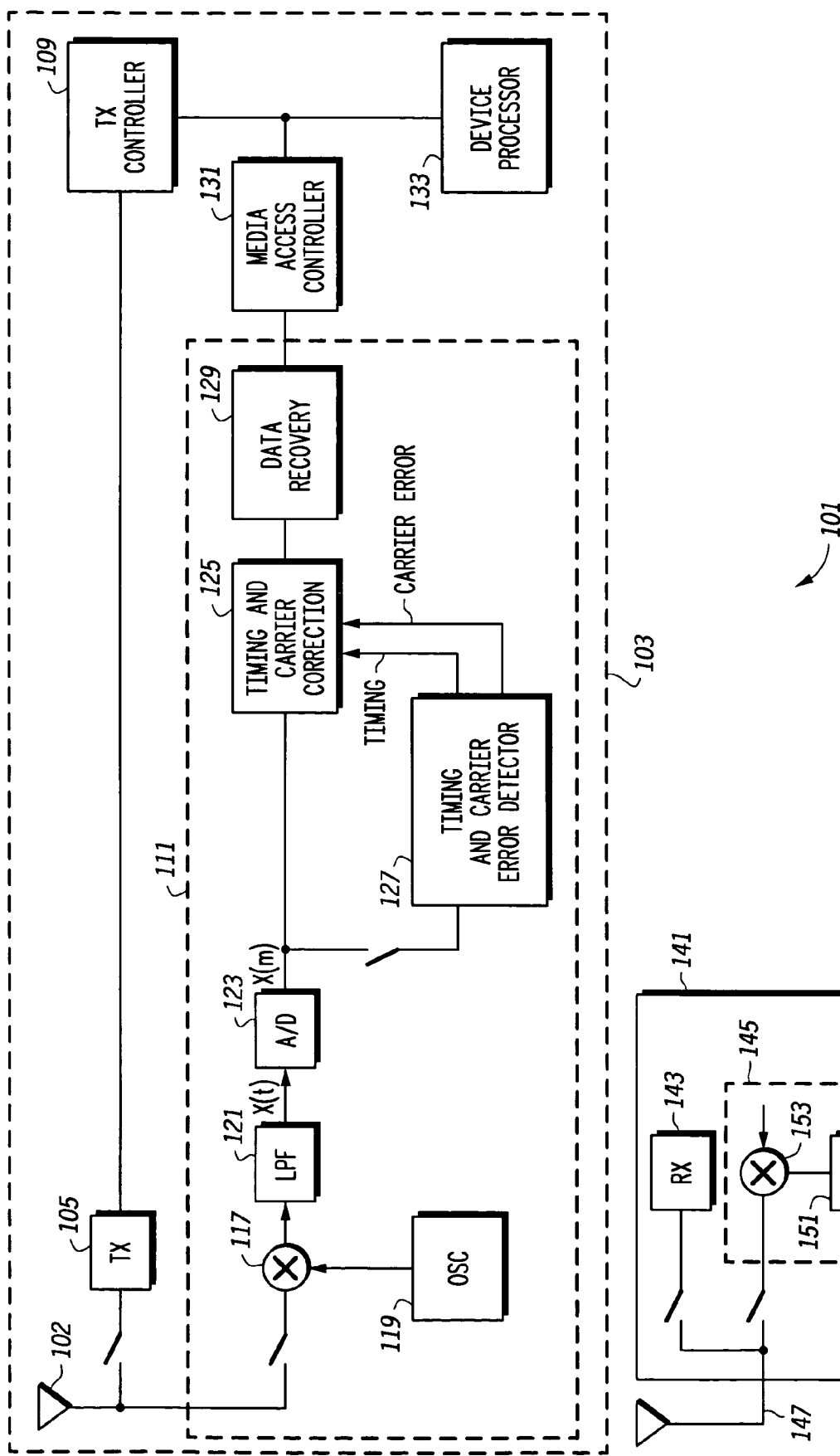
FIG. 1 is a block diagram of one embodiment of two communication devices according to the present invention.

FIG. 1 shows one example of two communication devices for providing a wireless network. Wireless network 101 includes communication device 103 and communication device 141. In one embodiment, communication devices 103 and 141 communicate with each other as per the wireless local area network (WLAN) 802.11 protocol. Other wireless networks may utilize other protocols in other embodiments. In one embodiment, communication device 103 is a cellular phone and device 141 is an access point 141. However, in other embodiments, communications devices 103 and 141 may be any one of a wireless communication card or a wireless router.

Communication device 103 includes a transmitter 105 and a transmitter controller 109 for encoding and transmitting data (e.g. voice and application data) received from device processor 133 to be transmitted over antennae 102.

Communication device 103 also includes a receiver 111 for decoding data from a wireless signal received via antennae 102. In the embodiment shown, receiver 111 includes a mixer 117 for down converting the signal received via antennae 102 by a frequency provided by oscillator 119. The down converted signal is then filtered by low pass filter 121 and then converted from analog to digital form by analog to digital (A/D) converter 123. Receiver 111 may include, in some embodiments, an automatic gain controller (not shown) or other receiver modules (not shown).

Receiver 111 includes a timing and carrier error detector 127. Detector 127 extracts a timing signal from a packet signal received and provides that signal to timing and error correction module 125. In the embodiment shown, the timing signal provides an indication of the beginning of the data portion of a data packet in a received signal. Detector 127 also provides a carrier error signal which is used by the timing and carrier correction module 125 for correcting errors in the received signal due to the difference in frequency of the transmitting oscillator (e.g. 151) of a communication device (e.g. 141) that transmitted the signals being processed by receiver 111 from the receiver oscillator 119. Timing and carrier error detection and correction may be referred to as synchronization of a receiver. Detector 127 operates on the synchronization portion of each received data packet.

Timing and carrier correction module 125 provides a corrected signal to a data recovery module 129 wherein the data of the signal is extracted and provided to a media access controller 131. The media access controller interfaces with device processor 133 to provide the extracted data to device processor 133.

In one embodiment, the modules of receiver 111 are implemented in at least one integrated circuit, although in some embodiments, each module of receiver 111 may be implemented with a different component. In some embodiments, at least some portions of receiver 111 may be implemented by a processor executing software. In other embodiments, communications device 103 may have other configurations including a receiver (e.g. 111) with other configurations.

Communication device 141 includes a receiver 143 for decoding data received via antennae 147 from wireless signals transmitted by other communication devices of network 101. Communication device 141 also includes a transmitter 145 for transmitting signals to other communication devices of network 101. Transmitter 145 includes a mixer 153 and an oscillator 151 for providing the transmission frequency to mixer 153.

Figure 2:
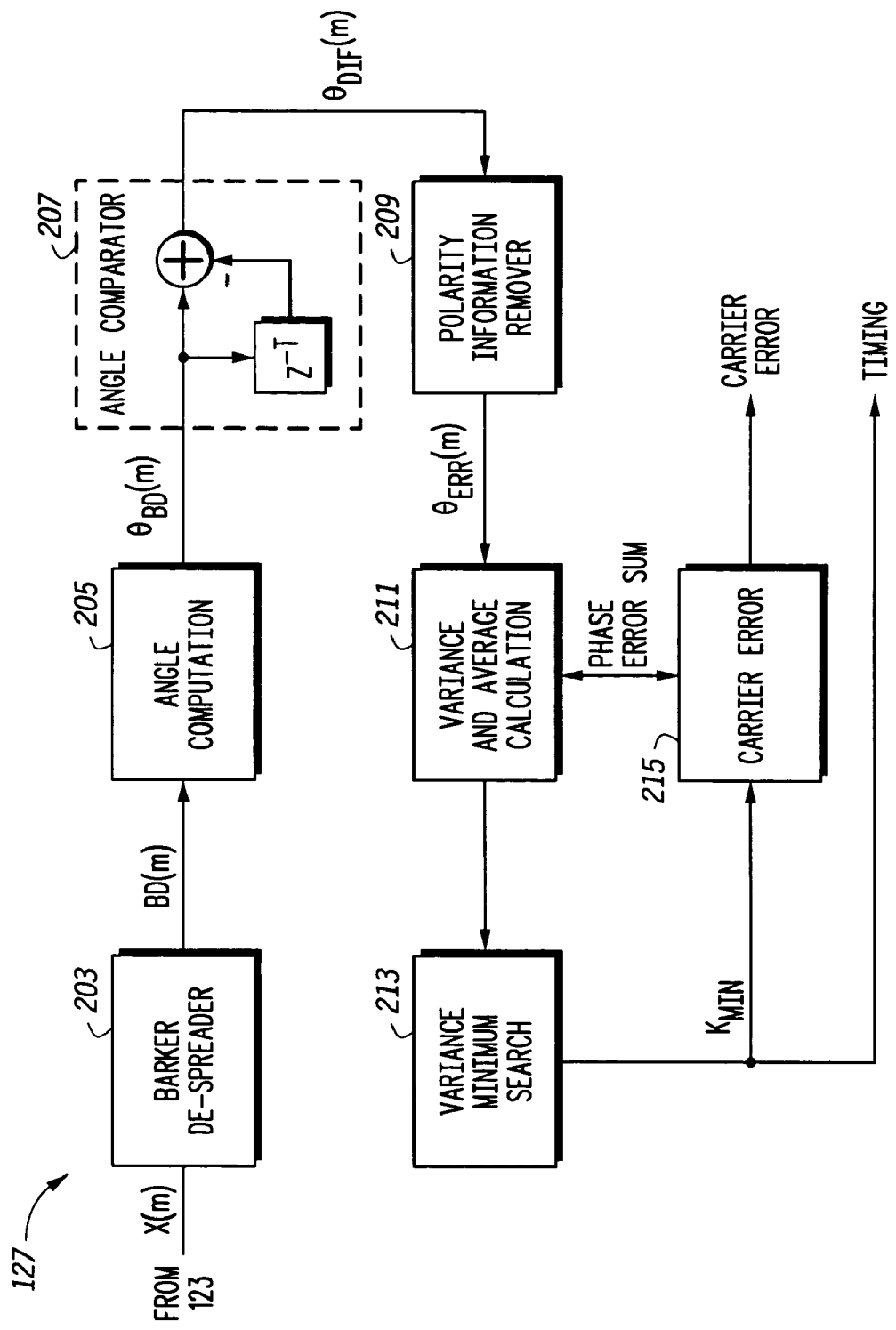
FIG. 2 is a block diagram of one embodiment of a timing and carrier error detector according to the present invention.

FIG. 2 is a block diagram of one embodiment of a timing and carrier error detector 127 according to the present invention. Detector 127 includes a Barker de-spreader 203 that receives a signal X(m) from A/D converter 123 and provides a Barker de-spread signal (BD(m)) at its output. A Barker de-spreader is a correlator that provides a correlated signal of the input signal with a known Barker symbol. In other embodiments, other types of correlators may be implemented.

FIG. 4 sets forth a representation of an input signal with an encoded synchronization pattern applied to a Barker de-spreader. Graph 403 shows a representation of an input signal (X(m)) having 4 Barker symbols (identified by BARKER 1, BARKER 2, etc.). Each Barker symbol is transmitted in a Barker symbol interval that has a length of one symbol period (T) between Barker symbol boundaries. For example, the first Barker symbol (BARKER 1) is transmitted in symbol interval 409 that has a length of T. For simplicity of illustration, each Barker symbol of graph 403 includes five chips that have either a positive value (e.g. chip 415) or a negative value (e.g. chip 417). However, in actuality a Barker symbol has eleven chips. The BARKER 2 symbol has a second polarity from the BARKER 1 symbol in that the polarization of the chips of the BARKER 2 symbol is different from the polarization of the chips of the BARKER 1 symbol. Although the signal shown in graph 403 includes discrete chips, signals received over a wireless channel may not appear in such a discrete form as that shown in graph 403 due to e.g. the use of low pass filters in the transmitter to reduce bandwidth.

Barker de-spreader 203 correlates the signal (X(m)) with a standard Barker symbol to provide a Barker de-spread signal BD(m). A representation of a standard Barker symbol is shown in graph 405 and a BD(m) signal corresponding to the input signal of graph 403 is set forth in graph 407. The BD(m) signal has a large magnitude of a first polarity when the received signal (X(m)) matches the standard signal in time (as at the center of a Barker symbol having a first polarity (e.g. BARKER 1)). The BD(m) signal has a large magnitude of a second polarity at the center of a Barker symbol having a second polarity (e.g. BARKER 2).

Detector 127 utilizes phase information of the Barker de-spreader signal to generate a timing signal and carrier error signal. Referring back to FIG. 2, angle computation module 205 extracts from the output of de-spreader 203 (BD(m)) a phase angle signal $\theta_{BD}(m)$. In one embodiment, module 205 determines the angle utilizing a look up table. In another embodiment, module 205 includes a coordinate rotation digital computer (CORDIC) circuit for calculating the phase angle from the de-spread signal.

Referring to FIG. 5, signal BD(m) can be represent by its real ($I_{BD}(m)$) and imaginary (($Q_{BD}(m)$)) components. See equation 503 in FIG. 5. The phase angle signal $\theta_{BD}(m)$ of BD(m) can be shown as the angle of the vector signal mapped by its real and imaginary coordinates. See graph 505.

Referring back to FIG. 2, angle comparator 207 compares the difference between the phase angle signal $\theta_{BD}(m)$ with a sample of the output of module 205 ($\theta_{BD}(m-T)$) that is temporally offset by a Barker symbol interval (T). The resultant output of comparator 207 is a phase difference signal $\theta_{DIF}(m)$.

$\theta_{DIF}(m)$ is provided to the polarity information remover module 209. Module 209 adjusts $\theta_{DIF}(m)$ due to the input signal X(m) being encoded with Barker symbols of certain polarization patterns. The output of module 209 is the phase error signal $\theta_{ERR}(m)$. In one embodiment, module modifies $\theta_{DIF}(m)$ to generate $\theta_{ERR}(m)$ according to equation (1) below:

$$\theta_{ERR}(n) = \begin{cases} \theta_{DIF}(n) - \pi, & \text{if } \theta_{DIF}(n) > \pi/2 \\ \theta_{DIF}(n), & \text{if } -\pi/2 \leq \theta_{DIF}(n) \leq \pi/2 \\ \theta_{DIF}(n) + \pi, & \text{if } \theta_{DIF}(n) < -\pi/2 \end{cases}$$

FIG. 6 sets forth a graph of one example of $\theta_{ERR}(m)$. The value of $\theta_{ERR}(m)$ varies over time between $\pi/2$ and $-\pi/2$. The value of $\theta_{ERR}(m)$ at the time of the centers of the Barker symbols are approximately the same depending upon the quality of the received signal. For example, at $TC_1$ (the time at the center of the BARKER 1 symbol), the value $\theta_{ERR}(TC_1)$ is equal to the value $\theta_{ERR}(TC_2)$ at $TC_2$ (the time at the center of the BARKER 2 symbol). $\theta_{ERR}(TC_1)$ is also equal to $\theta_{ERR}(TC_3)$ and $\theta_{ERR}(TC_4)$ as well.

For times other than at the centers of Barker symbols, the values of $\theta_{ERR}(m)$ are random.

The center of a Barker symbol can be determined by sampling the $\theta_{ERR}(m)$ at a specific number of sample positions (k) per Barker symbol interval (T) over a number of Barker symbol intervals, and finding the sample position (k) where the phase error signal $\theta_{ERR}(m)$ over the Barker symbol intervals has the smallest variance. For the example of FIG. 6, a Barker symbol interval is arbitrarily designated by a receiver as starting at sample time 621 and ending at sample time 623. Where there are 10 sample positions per symbol interval, the center of the Barker symbol is in the $8^{th}$ sample position relative to the arbitrary designation in that time $TC_2$ occurs eight sample position intervals after sample time 621 (and $TC_3$ occurs eight sample position intervals after time 623). Accordingly, in one embodiment, the timing signal would be generated to indicate the Barker symbol centers occur eight sample position intervals after the designated starting interval times.

The variance and average calculation detection module 211 utilizes the phase error signal to calculate the average phase error and an indication of the variance in the phase error signal for each sample position (k) over all of the intervals in which a Barker symbol is present.

Referring to the example of FIG. 6, each Barker symbol interval (T) includes ten sample positions (k). Accordingly, for the embodiment of FIG. 6, module 211 would calculate 10 average phase errors $\theta_{ERR}AVE(k)$ and 10 indications of variances $\theta_{ERR}VAR(k)$. In one embodiment, the average phase error $\theta_{ERR}AVE(k)$ for the 8th sample position would be calculated by adding the phase error value $\theta_{ERR}(m)$ at the 8th sample position of each Barker symbol interval (as arbitrarily designated) and then dividing the sum of the phase error values at that sample position by the number of Barker symbols intervals.

The variance minimum search module 213 selects the sample position ($k_{min}$) having the smallest variance ($\theta_{ERR}VAR(k_{min})$). In one embodiment, the minimum sample position ($k_{min}$) information is provided as the timing signal. In one embodiment, the carrier error module 215 provides as the carrier error signal, the average phase error ($\theta_{ERR}AVE(k_{min})$) for the sample position that was determined by module 213 to have the smallest variance.

FIGS. 7 and 8 each set forth a graph showing the phase error signal values and the average phase error ($\theta_{ERR}AVE(k)$) occurring at a sample position over four sample intervals. FIG. 7 shows a graph for sample position "a" which is very close to the center of the Barker symbols. As shown in the graph of FIG. 7, the value of the phase error signal ($\theta_{ERR}(m)$) occurring at those sample times of sample position a is very close to the average phase error for all four sample times ($T_{ka1}$, $T_{ka2}$, $T_{ka3}$, and $T_{ka4}$). FIG. 8 shows a graph for sample position "b" that is not close to the center of the Barker symbols. Even though the average phase errors may be roughly the same for the graphs of FIGS. 7 and 8 (e.g. $\theta_{ERR}AVE(a)$ is approximately equal to $\theta_{ERR}AVE(b)$), the variance in the phase error signal in FIG. 8 is greater than the variance in the phase error signal of FIG. 7.

Referring back to FIG. 2, the modules shown in FIG. 2 may be implemented in hardware, or in some embodiments, at least some of the modules implemented by a processor or processors executing code. In one embodiment, the modules of FIG. 2 may be implemented in a single integrated circuit chip (e.g. an ASIC). However, in other embodiments, the modules of FIG. 2 may implemented in multiple integrated circuit chips or have other configurations.

Figure 3:
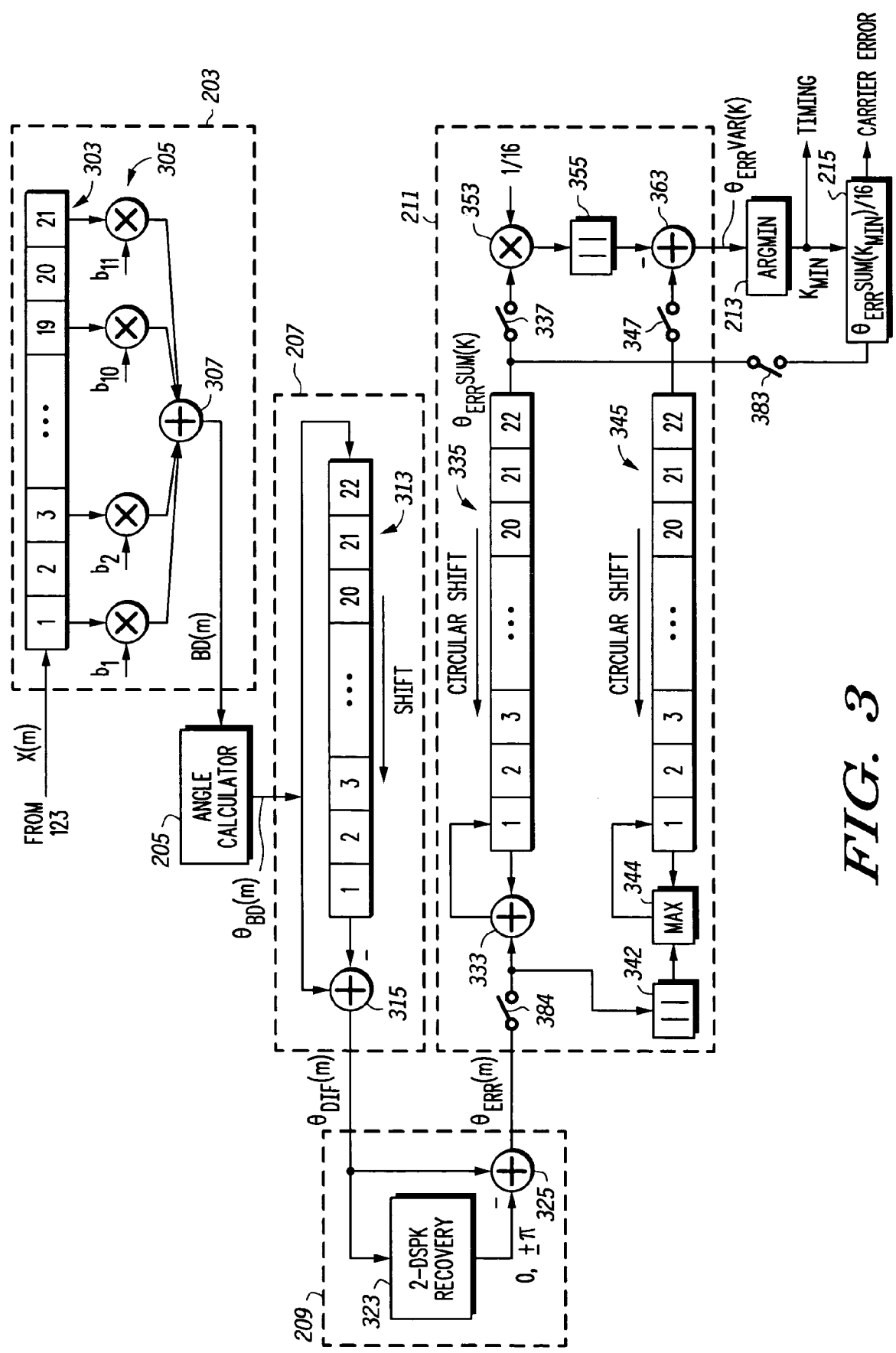
FIG. 3 is a more detailed block diagram of the timing and carrier error detector of FIG. 2.

FIG. 3 sets forth a more detailed embodiment of the modules of the Timing and Carrier Error Detector 127 of FIG. 2. For the embodiment of FIG. 3, each data packet includes 17 Barker symbols occurring at 17 Barker symbol intervals (T) with each Barker signal interval including 22 sample positions (k) (as opposed to 10 shown in the example of FIG. 6).

Barker de-spreader 203 includes a shift register 303 that stores values of X(m) measured at each sample time corresponding to a sample position interval. The output of every odd shift register position is connected to an input of a multiplier (e.g. the output of shift register position 21 is connected to the input of multiplier 305). The other inputs of the multipliers are "hardwired" to values indicative of the chips of a standard Baker symbol (e.g. see graph 405 of FIG. 4) at locations corresponding to the odd shift register positions when a Barker symbol is centered in shift register 303. The output of the multipliers is summed by summer 307 to produce Barker de-spread signal BD(m).

Angle calculator 205 generates the phase angle signal $\theta_{BD}(m)$ from BD(m).

Angle comparator 207 includes a shift register 313 for holding the value of $\theta_{BD}(m)$ sampled at the 22 previous sample position intervals. Comparator 207 includes a summer 315 having one input coupled to receive $\theta_{BD}(m)$ and another input for providing a negative of the value of $\theta_{BD}(m-T)$ sampled at one Barker symbol interval earlier (22 sample position intervals earlier).

The output of summer 315 ($\theta_{DIF}(m)$) is provided to the polarity information remover 209 that adjusts $\theta_{DIF}(m)$ for differences due to the different polarities of the Barker symbols. Remover 209 includes a 2-DPSK (differential phase shift keying) recovery module 323 that, in one embodiment, modifies $\theta_{DIF}(m)$ according to equation (1) above. The output of summer 325 is the phase error signal $\theta_{ERR}(m)$.

$\theta_{ERR}(m)$ is provided to variance and average calculation module 211. Module 211 performs operations for determining for each sample position (k), the sum of phase error signal ($\theta_{ERR}SUM(k)$) over 16 Barker symbol intervals and an indication of the variance in average phase error ($\theta_{ERR}VAR(k)$).

Equation (2) below sets forth a formula for calculating the variance for each sample position (k) over 16 Barker symbol intervals (I). In the embodiment of FIG. 3, module 211 determines an indication of the variance for each sample position (k) by equation (3), which is an approximation of the variance calculated in equation (2).

$$\theta_{ERR}VAR(k) = \sum_{n=0}^{I-1}\left[\theta_{ERR}(n22+k) - \frac{1}{I}\sum_{l=0}^{I-1}\theta_{ERR}(l22+k)\right]^2; \quad (2)$$

$$\theta_{ERR}VAR(k) = \max_{0\le n\le I-1}\{|\theta_{ERR}(n22+k)|\} - \frac{1}{I}\left|\sum_{l=0}^{I-1}\theta_{ERR}(l22+k)\right|; \quad (3)$$

In the embodiment of FIG. 3, detector 127 calculates as an indication of the variance and average phase error using data from 17 Barker symbols that provide $\theta_{ERR}(m)$ for 16 Barker symbol intervals used by module 211. The additional Barker symbol interval is utilized for phase difference calculations (e.g. by comparator 207). In other embodiments, a timing and error carrier detector may utilize a different equation for calculating average phase error and an indication of the variance (e.g. see module 911 of FIG. 9).

As shown by equation 3 above, $\theta_{ERR}VAR(k)$ for each sample position (k) is determined by finding the maximum of $\theta_{ERR}(M)$ for the sample position for any of the Barker symbol intervals minus $\theta_{ERR}AVE(k)$ of that sample position over all the Barker symbol intervals. The formula of equation 3 provides an approximation of the variance for each sample position.

Module 211 would calculate an indication of the variance for a sample position with the difference from the $\theta_{ERR}(m)$ value that is the greatest distance from the average phase error $\theta_{ERR}AVE(k)$ for the sample position. For example in FIG. 8, the maximum $\theta_{ERR}(m) - \theta_{ERR}AVE(b)$ occurs at $T_{kb2}$.

Thus, module 211 would determine that, for sample position b, the variance would be indicated as $\theta_{ERR}(T_{kb2})-\theta_{ERR}AVE$ (b).

Referring back to FIG. 3, module 211 includes a circular shift register 335 and summer 333 for calculating the sum of the values of the phase error signal ($\theta_{ERR}SUM(k)$) for each sample position (k) over 16 Barker symbol intervals (I). Each of the 22 shift register positions holds a value representing the running value of $\theta_{ERR}SUM(k)$ for one of the sample positions. After the phase error signal values for the 16$^{th}$ Barker symbol interval has been added to the running sums for all of the sample positions, switches 337 and 347 are closed and switch 384 is opened simultaneously wherein the $\theta_{ERR}SUM(k)$ for each sample position is then divided by 16 (the number of Barker symbol intervals) by multiplier 353.

Module 211 includes a circular shift register 345 having 22 shift register positions for storing the maximum value of $\theta_{ERR}(m)$ ($\theta_{ERR}MAX(k)$) for each sample position. For each value of $\theta_{ERR}(m)$ provided by module 209, magnitude operator 342 provides the magnitude of $\theta_{ERR}(m)$ to maximum value operator 344 (MAX). Operator 344 compares the magnitude of the $\theta_{ERR}(m)$ value received from operator 342 with $\theta_{ERR}MAX(k)$ from the first register position of register 345 for that sample position and provides the greater of the two values to the first register position.

Summer 363 adds for each sample position, $\theta_{ERR}MAX(k)$ with the negative of the magnitude (as provided by magnitude operator 355) of $\theta_{ERR}SUM(k)/16$ to provide an indication of the variance $\theta_{ERR}VAR(k)$ for each sample position.

Variance minimum search module 213 includes an argument of minimum search operator that searches the index of the 22 $\theta_{ERR}VAR(k)$ values to determine the sample position $k_{min}$ that provides the minimum value of $\theta_{ERR}VAR(k)$. In the embodiment shown, the $k_{min}$ value is the timing signal that is provided to the timing and carrier correction module 125 (see FIG. 1). In such an embodiment, correction module uses the $k_{min}$ to determine that the center of a Barker symbol occurs at $k_{min}$ number of sample time intervals from the arbitrary first sample position.

Carrier error selector 215 receives $k_{min}$ from module 213. At this time, switch 383 is closed to provide the $\theta_{ERR}SUM(k)$ values to selector 215. Selector 215 provides the sum value corresponding to $k_{min}$ ($\theta_{ERR}SUM(k_{min})$) divided by 16 (the number of Barker symbol intervals) as the carrier error signal to module 125 (see FIG. 1). In one embodiment, $\theta_{ERR}SUM(k)/16$ is scaled to obtain the carrier frequency error by module 125.

The modules shown in FIG. 3 may be implemented in hardware, or in some embodiments, at least some of the modules may be implemented by a processor or processors executing code. In one embodiment, the modules of FIG. 3 may be implemented in a single integrated circuit chip. However, in other embodiments, the modules of FIG. 3 may implemented in multiple integrated circuit chips or have other configurations.

Figure 9:
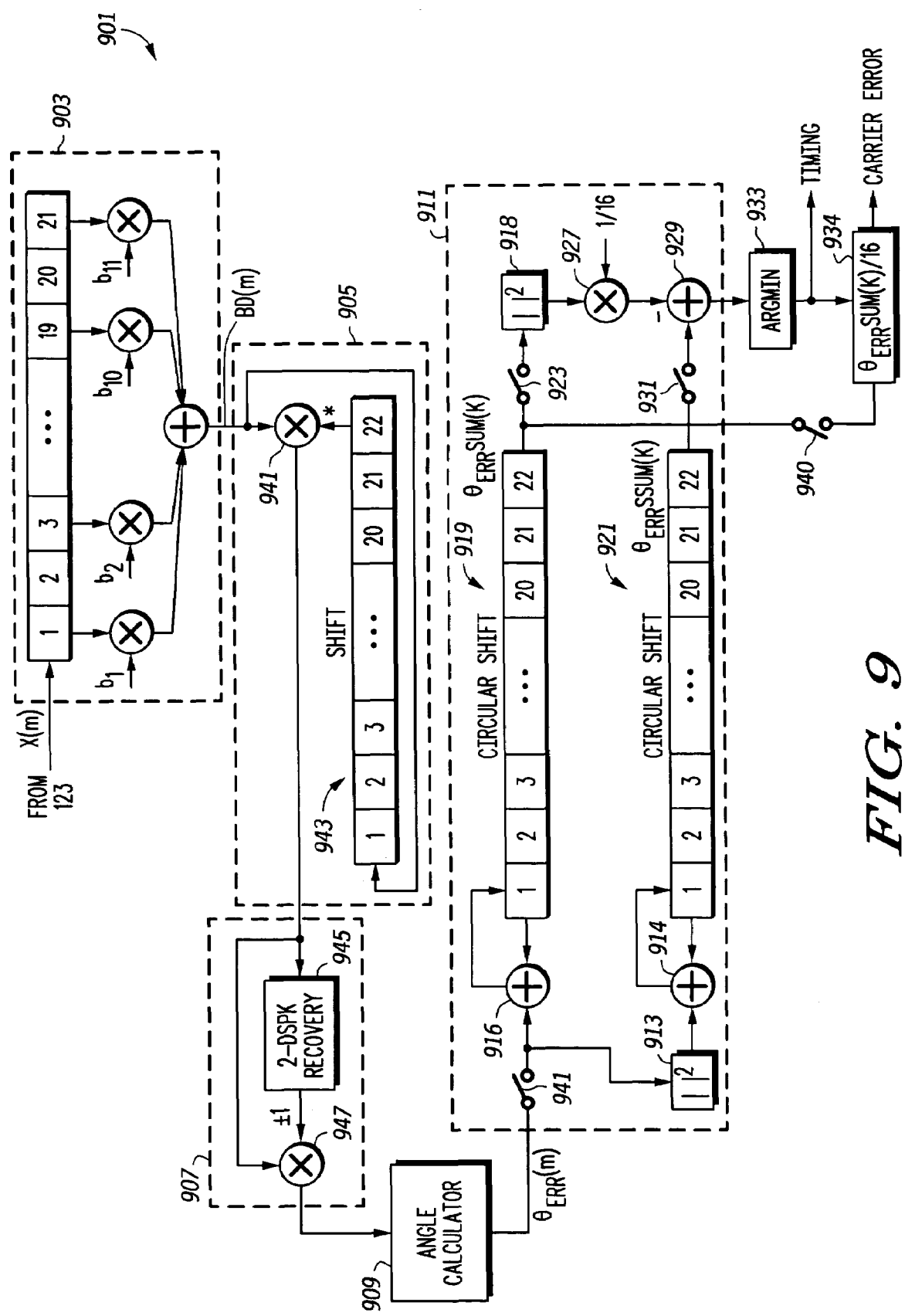
FIG. 9 is a block diagram of another embodiment of a timing and carrier detector according to the present invention.

FIG. 9 shows an alternative embodiment of timing and carrier error detector 127 (see FIG. 1). For the embodiment of FIG. 9, each data packet includes 17 Barker symbols (I) occurring in 17 Barker symbol intervals (T). Each Barker signal interval includes 22 sample positions (k). Detector 901 includes a Barker de-spreader 903 similar to de-spreader 203 as shown in FIG. 3. The Barker de-spread signal BD(m) is outputted from 903 to conjugate calculator 905. Conjugate calculator 905 includes a multiplier 941 for multiplying the present BD(m) signal with a conjugate of the Barker de-spread signal (BD(m−T)) from a sample time one Barker symbol interval earlier as provided by circular shift register 943.

The output of calculator 905 is provided to an polarity information remover 907 which adjusts the output of calculator 905 for the differences in polarity of the Barker symbols. Remover 907 includes 2-DPSK (differential phase shift keying) recovery module 945 that, in one embodiment, determines whether the real part (I(m)) of the output of calculator 905 is positive or negative and then provides a +1 to multiplier 947 if positive and a −1 to multiplier 947 if negative.

The output of phase remover 907 is provided to angle calculator 907 to obtain the phase angle of the output of 907. The output of calculator 909 is the phase error signal $\theta_{ERR}(m)$ signal of signal BD(m).

Detector 901 includes a variance and average calculation model 911. Module 911 provides an indication of the variance $\theta_{ERR}VAR(k)$ according to equation 4 below:

$$\theta_{ERR}VAR(k) = \sum_{n=0}^{I-1} \theta_{ERR}^2(n22+k) - \frac{1}{I}\left[\sum_{I=0}^{I-1} \theta_{ERR}(n22+k)\right]^2; \qquad (4)$$

Equation 4 is a mathematical equivalent of the equation for $\theta_{ERR}VAR(k)$ of equation 2 above. Equations 2 and 4 provide an accurate measure of the variance of $\theta_{ERR}$ whereas equation 3 provides an approximation. For module 911, I=16.

Module 911 includes a circular shift register 919 and summer 916 for calculating the sum of the values for the phase error signal ($\theta_{ERR}SUM(k)$) for each sample position (k) over 16 Barker symbol intervals (I). Each of the 22 shift register positions holds a value representing the running value of $\theta_{ERR}SUM(k)$ for one of the sample positions. After the phase error signal values for the 16$^{th}$ Barker symbol interval has been added to the running sums for all of the sample positions, switches 923 and 931 are closed and switch 941 is opened simultaneously wherein the values of $\theta_{ERR}SUM(k)$ are provided to squared magnitude operator 918.

Module 911 includes a squared magnitude operator 913, summer 914, and a circular shift register 921 for calculating for each sample position (k), the sum of the squared $\theta_{ERR}(m)$ values ($\theta_{ERR}SSUM(k)$) over 16 Barker symbol intervals.

After the phase error signal values for the 16$^{th}$ Barker symbol intervals has been provided to module 911 and switches 923 and 931 are closed, summer 929, for each sample position, subtracts the square of $\theta_{ERR}SUM(k)$ divided by 16 (by multiplier 927) from $\theta_{ERR}SSUM(k)$ to obtain $\theta_{ERR}VAR(k)$ for each sample position.

Variance minimum search module 933 includes an argument of minimum operator that searches the index of the 16 $\theta_{ERR}VAR(k)$ values to determine the sample position $k_{min}$ that provides the minimum value $\theta_{ERR}VAR(k)$.

Carrier error selector 934 receives $k_{min}$ from module 933. At this time, switch 940 is closed to provide the $\theta_{ERR}SUM(k)$ values to selector 934. Selector 934 provides the sum value corresponding to $k_{min}$ ($\theta_{ERR}SUM(k_{min})$) divided by 16 (the number of Barker symbol intervals) as the carrier error signal to module 125 (see FIG. 1). In one embodiment, $\theta_{ERR}SUM(k)/16$ is scaled to obtain the carrier frequency error.

The modules shown in FIG. 9 may be implemented in hardware, or in some embodiments, at least some of the modules may be implemented by a processor or processors executing code. In one embodiment, the modules of FIG. 9 may be implemented in a single integrated circuit chip. However, in other embodiments, the modules of FIG. 9 may implemented in multiple integrated circuit chips or have other configurations.

In other embodiments, the timing and error detector module may have other configurations. For example, a timing and error detector may includes modules for generating an indication of variance of a sample position that is a mathematical equivalent to either that set forth in equation 3 or equation 4 above. Furthermore, other timing and error detector modules may include other configurations for generating a phase error signal. Still in other configurations, a timing and error detector module may generate a timing signal using other types of phase information of a correlated signal. In modification of the module 901, module 211 may be implemented in place of module 911 or $\theta_{ERR}(m)$ may be generated by the modules (205, 207, and 209) set forth in FIG. 3. In a modification of FIG. 3, module 911 may be implemented in place of module 211 or $\theta_{ERR}(m)$ may be generated by the modules (905, 907, and 909) set forth in FIG. 9. In other embodiments, the timing and carrier detection and correction modules described herein may be used in other types of communication receivers (e.g. for receivers for wired networks).

In one embodiment, a method for generating a timing signal in a communication receiver includes generating a correlated signal from a received signal, deriving phase information of the correlated signal, and generating a timing signal using the phase information.

In another embodiment, a communication receiver includes means for generating a correlated signal from a received signal, means for generating a phase error signal from the correlated signal, and means for generating a timing signal from the phase error signal.

In another embodiment, a timing detector for a communication receiver includes a correlator coupled to receive a received signal. The correlator correlates the received signal to produce a correlated signal. The receiver includes a phase information module coupled to receive the correlated signal. The phase information module derives phase information of the correlated signal. The receiver further includes a timing signal module coupled to receive the phase information. The timing signal module provides a timing signal. The timing signal module generates the timing signal using the phase information.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method for generating a timing signal in a communication receiver, the method comprising:
   generating a correlated signal from a received signal;
   deriving phase information of the correlated signal, wherein the deriving the phase information includes generating a phase error signal of the correlated signal; and
   generating a timing signal using the phase information, wherein generating the timing signal includes using the phase error signal to generate the timing signal, wherein each of a plurality of symbol intervals of the correlated signal includes a plurality of sample times, wherein each sample time corresponds to a sample position of a plurality of sample positions, wherein:
   the generating the timing signal includes calculating an indication of a variance of the phase error signal for each sample position over the plurality of symbol intervals.

2. The method of claim 1 further comprising:
   wherein the generating the correlated signal further includes correlating the received signal with a standard Barker symbol.

3. The method of claim 1 wherein:
   the generating a timing signal further includes determining a sample position of the plurality of sample positions having a minimum indication of the variance as determined by the calculating an indication of the variance;
   wherein the timing signal is based upon the indication of the variance of the sample position having the minimum indication of the variance.

4. The method of claim 3 further comprising: generating a carrier error signal using the indication of the variance of the sample position having the minimum indication of the variance.

5. The method of claim 4 wherein the carrier error symbol is based upon an average phase error of a sample position over the plurality of symbol intervals for the sample position having the minimum indication of the variance.

6. The method of 1 wherein the calculating an indication of the variance further includes for each sample position, calculating a sum of values of the phase error signal over the plurality of symbol intervals.

7. The method of claim 1 wherein the indication of a variance of the error signal for each sample position is calculated by the formula below:

$$\theta_{ERR}\text{VAR}(k) = \max_{0 \le n \le l-1} \{|\theta_{ERR}(n22+k)|\} - \frac{1}{l}\left|\sum_{l=0}^{l-1} \theta_{ERR}(n22+k)\right|;$$

wherein $\theta_{ERR}(m)$ is the phase error signal, k is the sample position, and l is the number of symbol intervals.

8. The method of claim 1 wherein the indication of a variance of the error signal for each sample position is calculated by the formula below:

$$\theta_{ERR}\text{VAR}(k) = \sum_{n=0}^{l-1} \theta_{ERR}^2(n22+k) - \frac{1}{l}\left[\sum_{l=0}^{l-1}\theta_{ERR}(n22+k)\right]^2;$$

wherein $\theta_{ERR}(m)$ is the phase error signal, k is the sample position, and l is the number of symbol intervals.

9. The method of claim 1 further comprising generating a carrier error signal using the phase information.

10. The method of claim 9 further comprising correcting errors in the received signal due to differences in a receiver oscillator versus a transmitting oscillator using the carrier error signal.

11. The method of claim 1 wherein the timing signal is indicative of a symbol boundary in a synchronization pattern of a data packet of the received signal.

12. The method of claim 1 wherein:
    the timing signal is indicative of a symbol boundary in a synchronization pattern of a data packet of a received signal;
    wherein the synchronization pattern includes symbols of a first polarity and symbols of a second polarity different from the first polarity, wherein the deriving phase information of the correlated signal further includes adjusting to remove information due to symbols being of different polarities.

13. The method of claim 1 wherein data is encoded in the received signal as per the WLAN 802.11 wireless protocol.

14. A communication receiver comprising:
means for generating a correlated signal from a received signal;
means for generating a phase error signal from the correlated signal;
means for generating a timing signal from the phase error signal, wherein the means for generating the timing signal includes means for using the phase error signal to generate the timing signal, wherein each of a plurality of symbol intervals of the correlated signal includes a plurality of sample times, wherein each sample time corresponds to a sample position of a plurality of sample positions, wherein:
the means for generating the timing signal includes means for calculating an indication of a variance of the phase error signal for each sample position over the plurality of symbol intervals.

15. The communication receiver of claim 14 wherein the means for generating the timing signal further includes means for generating a carrier error signal.

16. A timing detector for a communication receiver, the timing detector comprising:
a correlator coupled to receive a received signal, the correlator correlating the received signal to produce a correlated signal;
a phase information module coupled to receive the correlated signal, the phase information module deriving phase information of the correlated signal, wherein the phase information includes a phase error signal of the correlated signal;
a timing signal module coupled to receive the phase information, the timing signal module providing a timing signal, the timing signal module generating the timing signal using the phase information, wherein the timing signal module generates the timing signal using the phase error signal, and wherein the timing signal module includes a variance calculation module, the variance calculation module calculates an indication of a variance of the phase error signal for each sample position of a plurality of sample positions over a plurality of symbol intervals of the phase error signal, wherein each of a plurality of symbol intervals of the correlated signal includes a plurality of sample times, wherein each sample time corresponds to a sample position of the plurality of sample positions.

17. The timing detector of claim 16 wherein the timing signal module further comprises:
a variance minimum module coupled to the variance calculation module, the variance minimum module determines a sample position of the plurality having a minimum indication of the variance of the indications calculated by the variance calculation module;
wherein the timing signal is based upon the indication of the variance of the sample position having the minimum indication of the variance.

18. The timing detector of claim 17 further comprising:
a carrier error signal module, the carrier error signal module generating a carrier error signal using the sample position having the minimum indication of the variance.

19. The timing detector of 18 wherein the carrier error symbol is based upon an average phase error of a sample position over the plurality of symbol intervals for the sample position having the minimum indication of the variance.

20. The timing detector of claim 17 wherein the variance calculation module further includes a shift register and an adder coupled to receive the phase error signal, the shift register including a plurality of shift register positions, each shift register position for storing a sum of values of the phase error signal over the plurality of symbol intervals for a sample position, wherein the sum of values for a sample position is used to calculate the indication of a variance for the sample position.

21. The timing detector of claim 16 wherein the variance calculation module calculates an indication of a variance of the phase error signal for each sample position of a plurality of sample positions over a plurality of symbol intervals of the phase error signal by the formula below:

$$\theta_{ERR} \text{VAR}(k) = \max_{0 \le n \le l-1} \{|\theta_{ERR}(n22+k)|\} - \frac{1}{l}\left|\sum_{l=0}^{l-1} \theta_{ERR}(n22+k)\right|;$$

wherein $\theta_{ERR}(m)$ is the phase error signal, k is the sample position, and I is the number of symbol intervals.

22. The timing detector of claim 16 wherein the variance calculation module calculates an indication of a variance of the phase error signal for each sample position of a plurality of sample positions over a plurality of symbol intervals of the phase error signal by the formula below:

$$\theta_{ERR} \text{VAR}(k) = \sum_{n=0}^{l-1} \theta_{ERR}^2(n22+k) - \frac{1}{l}\left[\sum_{l=0}^{l-1} \theta_{ERR}(n22+k)\right]^2;$$

wherein $\theta_{ERR}(m)$ is the phase error signal, k is the sample position, and I is the number of symbol intervals.

23. The timing detector of claim 16 wherein the timing signal module generates a carrier error signal using the phase information.

24. The timing detector of claim 16 wherein the timing signal is indicative of a symbol boundary in a synchronization pattern of a data packet of the received signal.

25. The timing detector of claim 16 wherein:
the timing signal is indicative of a symbol boundary in a synchronization pattern of a data packet of a received signal;
wherein the synchronization pattern includes symbols of a first polarity and symbols of a second polarity different from the first polarity,
wherein the phase information module includes an information phase remover module that removes information due to symbols being of different polarities.

26. A communication receiver including the timing detector of claim 16, the communication receiver further including a timing carrier correction module coupled to receive the timing signal and coupled to receive the received signal.

27. The communication receiver of claim 26 wherein:
the timing signal module generates a carrier error signal using the phase information;
the timing correction module is coupled to receive the carrier error signal.

28. A communication device including the communication receiver of claim 26 and further comprising:
   an antennae, the timing carrier correction module and the timing detector coupled to the antennae to receive the received signal from the antennae.

29. The timing detector of claim 16 wherein data is encoded in the received signal as per the WLAN 802.11 wireless protocol.

* * * * *